(12) United States Patent
Larson, Jr. et al.

(10) Patent No.: US 10,703,502 B2
(45) Date of Patent: Jul. 7, 2020

(54) EMERGENCY POWER SYSTEM WITH ENERGY STORAGE DEVICE

(71) Applicant: HAMILTON SUNDSTRAND CORPORATION, Charlotte, NC (US)

(72) Inventors: Michael E. Larson, Jr., Rockford, IL (US); Timothy Scott Konicek, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 136 days.

(21) Appl. No.: 15/926,706

(22) Filed: Mar. 20, 2018

(65) Prior Publication Data

US 2019/0291888 A1    Sep. 26, 2019

(51) Int. Cl.
*B64D 41/00* (2006.01)
*H02J 4/00* (2006.01)

(52) U.S. Cl.
CPC .............. *B64D 41/007* (2013.01); *H02J 4/00* (2013.01); *B64D 2221/00* (2013.01)

(58) Field of Classification Search
CPC ...... B64D 2221/00; B64D 41/007; H02J 4/00
See application file for complete search history.

(56) References Cited

U.S. PATENT DOCUMENTS

| | | | |
|---|---|---|---|
| 8,424,800 B2 | 4/2013 | Finney | |
| 8,965,659 B2 | 2/2015 | Kaap et al. | |
| 9,083,201 B2 | 7/2015 | Bauer et al. | |
| 9,789,973 B2* | 10/2017 | Swearingen | B64D 41/007 |
| 2006/0102790 A1* | 5/2006 | Atkey | B64D 13/06 244/134 R |
| 2012/0318914 A1* | 12/2012 | Rajashekara | B64D 41/00 244/58 |
| 2013/0214589 A1* | 8/2013 | Swearingen | B64D 41/007 307/9.1 |

FOREIGN PATENT DOCUMENTS

FR    2899563 A1    10/2007
WO    0127468 A2    4/2001

OTHER PUBLICATIONS

Search Report dated Jul. 15, 2019, EP Application No. 19160768.8, 8 pages.

* cited by examiner

*Primary Examiner* — Jared Fureman
*Assistant Examiner* — Duc M Pham
(74) *Attorney, Agent, or Firm* — Cantor Colburn LLP

(57) ABSTRACT

A ram air turbine (RAT) system is provided. The RAT system includes a main generator, a RAT power generation unit, first circuitry, a storage device and second circuitry. The main generator and the RAT power generation unit are connectable to an aircraft bus by the first circuitry. The first circuitry includes a first switch which is controllable such that power is selectively provided to the aircraft bus from one of the main generator and the RAT power generation unit. The storage device is connectable to the aircraft bus by the second circuitry. The second circuitry includes a second switch which is controllable such that power is selectively provided to the aircraft bus from the storage device.

18 Claims, 3 Drawing Sheets

EMERGENCY POWER SYSTEM WITH ENERGY STORAGE DEVICE

BACKGROUND

The following description relates to emergency power systems and, more specifically, to an emergency power system of an aircraft that includes an energy storage device.

A ram air turbine (RAT) is a wind turbine that is connected to a hydraulic pump and/or electrical generator and is installed in an aircraft. The RAT can be used as a power source and can generate power from the airstream flowing along the aircraft due to the speed of the aircraft.

A key design consideration for each RAT system is low airspeed power production. To further complicate this design consideration, air degradation factors (ADF) that effect airflows must be considered. ADFs may include, but are not limited to, aircraft skin boundary effects, obstructions that obstruct airflows, such as landing gear, buffeting effects, etc. In general, all RAT installations must be designed with consideration for some amount of ADF that makes the available airflow at the RAT disk less than the actual aircraft airspeed.

Early in the design process of an aircraft or a RAT system, ADFs are estimated and the RAT is designed and qualified using this estimation. It is only during flight testing that the accuracy of the estimations can be checked and confirmed. If the estimated ADFs were non-conservative, significant redesign may be required.

In addition to the issues relating to ADFs, it is common for airframe designers to make derivative aircrafts from a certified design while making the new aircraft longer. This can negatively impact the accuracy of the ADF estimations, however, and can result in the RAT being incapable of providing a required level of power at low airspeeds.

BRIEF DESCRIPTION

According to an aspect of the disclosure, a ram air turbine (RAT) system is provided. The RAT system includes a main generator, a RAT power generation unit, first circuitry, a storage device and second circuitry. The main generator and the RAT power generation unit are connectable to an aircraft bus by the first circuitry. The first circuitry includes a first switch which is controllable such that power is selectively provided to the aircraft bus from one of the main generator and the RAT power generation unit. The storage device is connectable to the aircraft bus by the second circuitry. The second circuitry includes a second switch which is controllable such that power is selectively provided to the aircraft bus from the storage device.

In accordance with additional or alternative embodiments, a generator control unit (GCU) is configured to control operations of the first and second switches.

In accordance with additional or alternative embodiments, the storage device includes at least one of a battery and a capacitor.

In accordance with additional or alternative embodiments, the aircraft bus includes an aircraft essential alternating current (AC) bus.

In accordance with additional or alternative embodiments, the second circuitry includes at least one of a direct current (DC)/alternating current (AC) power converter and a DC-DC step-up converter.

In accordance with additional or alternative embodiments, an aircraft essential direct current (DC) bus is connected to the storage device.

In accordance with additional or alternative embodiments, the RAT system includes third circuitry by which the RAT power generation unit provides power to the storage device.

According to yet another aspect of the disclosure, a ram air turbine (RAT) system is provided. The RAT system includes a main generator, a RAT power generation unit, first circuitry by which the main generator and the RAT power generation unit are connectable to a first aircraft bus, a storage device and second circuitry by which the storage device is connectable to a second aircraft bus. The first circuitry includes a first switch which is controllable such that power is provided to the first aircraft bus from one of the main generator and the RAT power generation unit. The second circuitry includes a second switch which is controllable such that power is provided to the second aircraft bus from the electrical storage device.

In accordance with additional or alternative embodiments, a generator control unit (GCU) is configured to control operations of the first and second switches.

In accordance with additional or alternative embodiments, the storage device includes at least one of a battery and a capacitor.

In accordance with additional or alternative embodiments, the first aircraft bus includes an aircraft essential alternating current (AC) bus and the second aircraft bus includes an aircraft essential direct current (DC) bus.

In accordance with additional or alternative embodiments, the RAT system further includes third circuitry by which the RAT power generation unit provides power to the storage device.

In accordance with additional or alternative embodiments, the second switch is controlled such that power is provided to the second aircraft bus from the storage device when the first switch is controlled such that power is provided to the first aircraft bus from the main generator.

According to yet another aspect of the disclosure, a ram air turbine (RAT) system is provided. The RAT system includes a main generator, a RAT power generation unit, a storage device and first, second and third circuitry. The main generator and the storage device are connectable to a first aircraft bus by way of the first circuitry. The first circuitry includes a first switch which is controllable such that power is provided to the first aircraft bus from one of the main generator and the storage device. The storage device is connectable to a second aircraft bus by way of the second circuitry. The second circuitry includes a second switch which is controllable such that power is provided to the second aircraft bus from the storage device by way of the second switch. The RAT power generation unit is connectable to the storage device by way of the third circuitry.

In accordance with additional or alternative embodiments, a generator control unit (GCU) is configured to control operations of the first and second switches.

In accordance with additional or alternative embodiments, the storage device includes at least one of a battery and a capacitor.

In accordance with additional or alternative embodiments, the first aircraft bus includes an aircraft essential alternating current (AC) bus and the second aircraft bus includes an aircraft essential direct current (DC) bus.

In accordance with additional or alternative embodiments, the first circuitry includes at least one of a direct current (DC)/alternating current (AC) power converter and a DC-DC step-up converter and a DC/AC power converter.

In accordance with additional or alternative embodiments, the second switch is controlled such that power is provided to the second aircraft bus from the storage device when the first switch is controlled such that power is provided to the first aircraft bus from the main generator.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an electrical power storage device is added to a RAT system of an aircraft. The electrical power storage device could include or be provided as a series of supercapacitors, batteries or other similar devices. In addition, AC to DC and/or DC to AC converters may be provided in the RAT system to provide a particular type of electrical power to aircraft buses.

Figure 1:
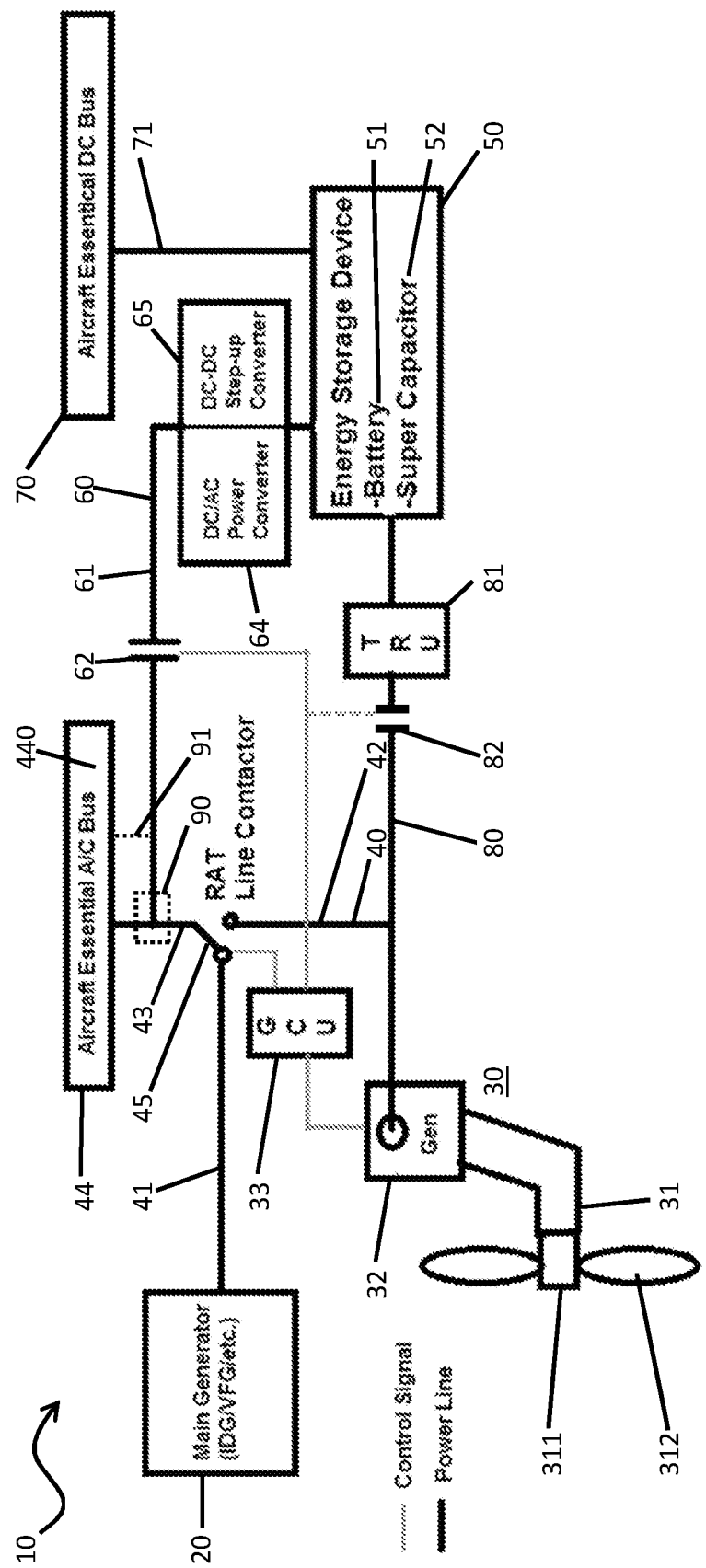
FIG. 1 is a schematic diagram illustrating a ram air turbine (RAT) system in accordance with embodiments.

With reference to FIG. 1, a ram air turbine (RAT) system 10 is provided. The RAT system 10 includes a main generator 20, a RAT power generation unit 30, first circuitry 40, an electrical or power storage device (hereinafter referred to as a "power storage device") 50 and second circuitry 60.

The RAT system 10 may be installed on an aircraft, for example, and the main generator 20 may be provided as the main generator of the aircraft which is attached to one or more of the engines or the on-board batteries. The RAT power generation unit 30 includes a RAT 31, RAT generator 32 and a generator control unit (GCU) 33. The RAT 31 is deployable at a distal end of a strut 310 to extend into an airstream at an exterior of the aircraft. The RAT 31 includes a hub 311 and blades 312 extending radially outwardly from the hub 311. As the blades 312 interact with the airstream, the blades 312 and the hub 311 rotate about a rotational axis and drive corresponding rotation of a driveshaft within the strut 310. This driveshaft is coupled to the RAT generator 32 such that the rotation of the driveshaft can be converted into power (electrical, hydraulic, etc.) by the RAT generator 32. The GCU 33 monitors an output of the RAT generator 32, determines whether the power output is sufficient for a given operation of the aircraft and takes actions based on results of the determinations accordingly as will be described below.

During operations of the aircraft, when a situation arises during which the aircraft does not receive sufficient power from the main generator, the RAT 31 is deployed to derive power from the interactions between the RAT 31 and the airstream. At low airspeeds, however, the RAT 31 may not be configured to generate the required amount of power due at least partially to insufficient airspeed, air degradation factors (ADFs) or other similar issues. The monitoring of the GCU 33 may be configured to determine that this is the case in a given situation and to take appropriate action accordingly.

The first circuitry 40 includes a first circuitry first bus 41, a first circuitry second bus 42, a first circuitry third bus 43, which is electrically connected to a first aircraft bus 44, and a first switch 45. The first circuitry first bus 41 is connected at opposite ends thereof to the main generator 20 and a first contract of the first switch 45, the first circuitry second bus 42 is connected at opposite ends thereof to the RAT generator 32 (by way of the GCU 33) and a second contact of the first switch 45 and the first circuitry third bus 43 is connected at opposite ends thereof to the first switch 45 and the first aircraft bus 44. As such, the first circuitry 40 is configured such that the main generator 20 and the RAT power generation unit 30 are respectively connectable to the first aircraft bus 44.

The first switch 45 may be provided as a RAT line contactor (RLC) and may be controllable by the GCU 33 to selectively assume open or closed conditions. When the GCU 33 causes the first switch 45 to assume the open condition, electrical power is selectively provided to the first aircraft bus 44 from the main generator 20 by way of the first switch 45. When the GCU 33 causes the first switch 45 to assume the closed condition, electrical power is selectively provided to the first aircraft bus 44 from the RAT power generation unit 30 by way of the first switch 45.

The power storage device 50 may be configured to store power, electrical or otherwise, for provision to various aircraft systems. The power storage device 50 may also be re-chargeable. To this end, the power storage device 50 may include or be provided as at least one of one or more batteries 51 and one or more capacitors (e.g., supercapacitors) 52. The power storage device 50 can be initially charged during ground operations and re-charged as needed during flight operations.

In accordance with embodiments, the power storage device 50 sizing may be based upon a possible need for the RAT power generation unit 30 to be supplemented and a duration the supplemented power is expected to be required.

The second circuitry 60 includes a second circuitry first bus 61, which is electrically connected at opposite ends thereof to the power storage device 50 and the first circuitry third bus 43, and a second switch 62, which is disposed along the second circuitry first bus 61. As such, the second circuitry 60 is configured such that the electrical storage device 50 is connectable to the first aircraft bus 44.

The second switch 62 is controllable by the GCU 33 such that electrical power is selectively provided to the aircraft bus 44 from the power storage device 50 by way of the second switch 62. In accordance with embodiments, in a case in which the GCU 33 would normally cause the first switch 45 to assume the closed condition but determines as a result of the monitoring that the RAT generator 32 is under-frequency (i.e., not providing sufficient power to the first aircraft bus 44), the GCU 33 may cause the first switch 45 to assume the open condition and may operate the second switch 62 such that the first aircraft bus 44 receives power from the electrical storage device 50.

In accordance with embodiments, the first aircraft bus 44 may include or be provided as an aircraft essential alternating current (AC) bus 440. In these or other cases, the second circuitry 60 may further include at least one of a direct current (DC)/AC power converter 64 and a DC-DC step-up converter 65. In accordance with further embodiments, the RAT system 10 may also include a second or aircraft essential DC bus 70 as well as third circuitry 80. The aircraft essential DC bus 70 may be electrically connected or coupled to the power storage device 50 by way of an additional bus 71. The RAT power generation unit 30 may provide power to the power storage device 50 by way of the third circuitry 80 and, to this end, the third circuitry 80 may include a transformer rectifier unit (TRU) 81 for AC to DC conversions between the RAT power generation unit 30 and the power storage device 50. As such, the power storage device 50 and the aircraft essential DC bus 70 can exchange power in either direction and, when the GCU 33 causes the first switch 45 to assume the open condition, the RAT generator 32 can provide power to the power storage device 50 as at least a trickle charge.

In accordance with still further embodiments, the third circuitry 80 may include a third switch 82 upstream or downstream from the TRU 81. The third switch 82 is controllable by the GCU 33 to provide for greater flexibility of the RAT system 10. For example, the second and third switches 62 and 82 may be operated by the GCU 33 in concert to allow the power storage device 50 to supplement the RAT power generation unit 30 during flight operations when the aircraft is at low but not minimal airspeeds and the RAT power generation unit 30 is generating low but not insufficiently low power for the first aircraft bus 44.

Figure 2:
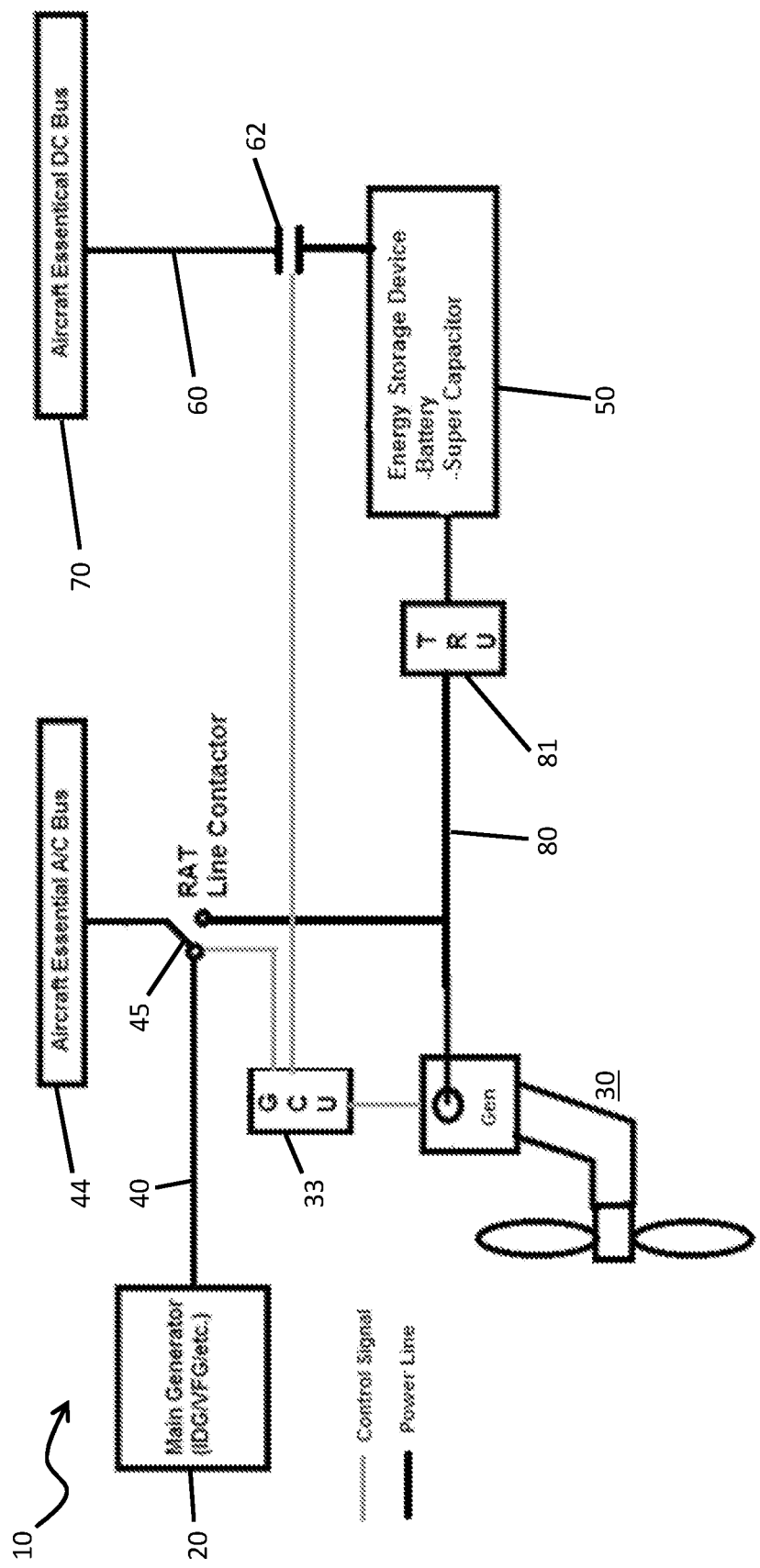
FIG. 2 is a schematic diagram illustrating a ram air turbine (RAT) system in accordance with alternative embodiments.
Figure 3:
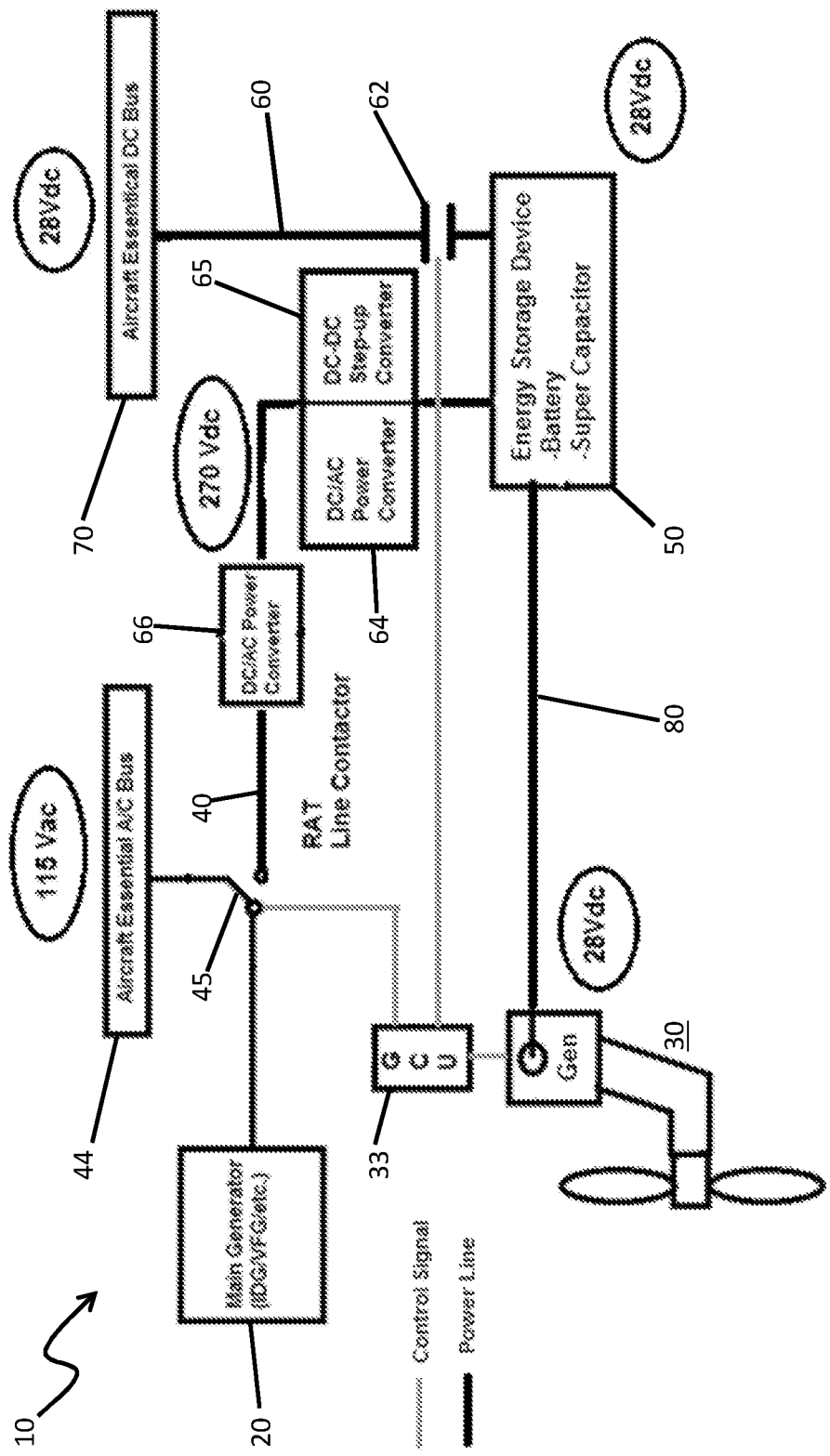
FIG. 3 is a schematic diagram illustrating a ram air turbine (RAT) system in accordance with alternative embodiments.

With reference to FIGS. 2 and 3, alternative embodiments of the RAT system 10 are provided and will be described in detail below. These alternative embodiments each include similar features as those described above with reference to FIG. 1 and these similar features need not be re-described below.

As shown in FIG. 2, the first circuitry 40 is configured such that the main generator 20 and the RAT power generation unit 30 are connectable to the first aircraft bus 44 and the first switch 45 is controllable by the GCU 33 such that electrical power is provided to the first aircraft bus 44 from one of the main generator 20 and the RAT power generation unit 30 by way of the first switch 45. The second circuitry 60, on the other hand, is now configured such that the power storage device 50 is connectable to the second aircraft bus 70 by way of the second circuitry 60. The second switch 62 is disposed along the second circuitry 60 and is controllable by the GCU 33 such that power can be exchanged between the second aircraft 70 and the power storage device 50 in either direction by way of the second switch 62. That is, the second switch 62 may be controlled such that electrical power is provided to the second aircraft bus 70 from the power storage device 50 when the first switch 45 is controlled such that electrical power is provided to the first aircraft bus 44 from the main generator 20.

As shown in FIG. 3, the first circuitry 40 is configured such that the main generator 20 and the power storage device 50 are connectable to the first aircraft bus 44 by way of the first switch 45, the second circuitry 60 is configured such that the power storage device 50 is connectable to the second aircraft bus 70 by way of the second switch 62 and the third circuitry 80 is configured such that the RAT power generation unit 30 is directly electrically connected to the power storage device 50. The first circuitry 40 includes at least one of a DC/AC power converter 64 and a DC-DC step-up converter 65 and a DC/AC power converter 66. The second switch 62 is controlled such that electrical power is exchanged between the second aircraft bus 70 and the power storage device 50 in either direction when the first switch 45 is controlled such that electrical power is provided to the first aircraft bus 44 from the main generator 20.

Although the descriptions provided herein generally relate to cases in which power is provided to the first aircraft bus 44 from the RAT power generation unit 30 or the power storage device 50 but not from the RAT power generation unit 30 and the power storage device 50. It is to be understood, however, that this is possible and that the first aircraft bus 44 can receive power from the RAT power generation unit 30 and the power storage device 50 simultaneously. In the embodiments of FIG. 1, such a configuration may include, for example, a control device 90 or a bypass bus 91. The control device 90 may be operably disposed at the connection between the second circuitry first bus 61 and the first circuitry third bus 43. The control device 90 may be configured to sense or otherwise detect phases of currents being carried along the first circuitry third bus 43 and the second circuitry first bus 61 and to provide a phase correction to one or both that brings the phases into correspondence so that they can be provided to the first aircraft bus 44 together. In the case of the bypass buss 91, currents carried along the first circuitry third bus 43 and the second circuitry first bus 61 can be provided in parallel to different portions of the first aircraft bus 44.

Benefits of the features described herein are the provision of a RAT design that is more tolerant to ADF variances to reduce the risk of late design changes, the provision of a RAT system that can provide emergency electrical power for longer period and at lower airspeeds, the provision of a RAT system which is tailorable and flexible for new aircrafts and the provision of a RAT system that can be made relatively small but which can still accommodate transient loads that exceed the RAT turbine steady state capability.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A ram air turbine (RAT) system, comprising:
   a main generator;
   a RAT power generation unit;
   first circuitry by which the main generator and the RAT power generation unit are connectable to an aircraft bus, the first circuitry comprising a first switch which is controllable such that power is selectively provided to the aircraft bus from one of the main generator and the RAT power generation unit;
   a storage device;
   second circuitry by which the storage device is connectable to the aircraft bus, the second circuitry comprising a second switch which is controllable such that power is selectively provided to the aircraft bus from the storage device; and
   third circuitry by which the RAT power generation unit provides power to the storage device.

2. The RAT system according to claim 1, further comprising a generator control unit (GCU) configured to control operations of the first and second switches.

3. The RAT system according to claim 1, wherein the storage device comprises at least one of a battery and a capacitor.

4. The RAT system according to claim 1, wherein the aircraft bus comprises an aircraft essential alternating current (AC) bus.

5. The RAT system according to claim 4, wherein the second circuitry comprises at least one of a direct current (DC)/alternating current (AC) power converter and a DC-DC step-up converter.

6. The RAT system according to claim 4, further comprising an aircraft essential direct current (DC) bus which is connected to the storage device.

7. The RAT system according to claim 1, wherein the second switch is controlled such that power is provided to the aircraft bus from the storage device when the first switch is controlled such that power is provided to the aircraft bus from the main generator.

8. A ram air turbine (RAT) system, comprising:
a main generator;
a RAT power generation unit;
first circuitry by which the main generator and the RAT power generation unit are connectable to a first aircraft bus, the first circuitry comprising a first switch which is controllable such that power is provided to the first aircraft bus from one of the main generator and the RAT power generation unit;
a storage device;
second circuitry by which the storage device is connectable to a second aircraft bus, the second circuitry comprising a second switch which is controllable such that power is provided to the second aircraft bus from the storage device; and
third circuitry by which the RAT power generation unit provides power to the storage device.

9. The RAT system according to claim 8, further comprising a generator control unit (GCU) configured to control operations of the first and second switches.

10. The RAT system according to claim 8, wherein the storage device comprises at least one of a battery and a capacitor.

11. The RAT system according to claim 8, wherein the first aircraft bus comprises an aircraft essential alternating current (AC) bus and the second aircraft bus comprises an aircraft essential direct current (DC) bus.

12. The RAT system according to claim 8, wherein the second switch is controlled such that power is provided to the second aircraft bus from the storage device when the first switch is controlled such that power is provided to the first aircraft bus from the main generator.

13. A ram air turbine (RAT) system, comprising:
a main generator;
a RAT power generation unit;
a storage device;
first circuitry by which the main generator and the storage device are connectable to a first aircraft bus, the first circuitry comprising a first switch which is controllable such that power is provided to the first aircraft bus from one of the main generator and the storage device;
second circuitry by which the electrical storage device is connectable to a second aircraft bus, the second circuitry comprising a second switch which is controllable such that power is provided to the second aircraft bus from the storage device; and
third circuitry by which the RAT power generation unit is connectable to the storage device.

14. The RAT system according to claim 13, further comprising a generator control unit (GCU) configured to control operations of the first and second switches.

15. The RAT system according to claim 13, wherein the storage device comprises at least one of a battery and a capacitor.

16. The RAT system according to claim 13, wherein the first aircraft bus comprises an aircraft essential alternating current (AC) bus and the second aircraft bus comprises an aircraft essential direct current (DC) bus.

17. The RAT system according to claim 16, wherein the first circuitry comprises:
at least one of a direct current (DC)/alternating current (AC) power converter and a DC-DC step-up converter; and
a DC/AC power converter.

18. The RAT system according to claim 13, wherein the second switch is controlled such that power is provided to the second aircraft bus from the storage device when the first switch is controlled such that power is provided to the first aircraft bus from the main generator.

* * * * *